Aug. 6, 1957 — H. WIESE — 2,802,053
ELECTRO ACOUSTIC MEASURING APPARATUS ESPECIALLY AUDIO METER
Filed May 13, 1953 — 2 Sheets-Sheet 1

INVENTOR
Hermann Wiese
Ezekiel Wolf
his Attorney

INVENTOR
Hermann Wiese

United States Patent Office 2,802,053
Patented Aug. 6, 1957

2,802,053

ELECTRO ACOUSTIC MEASURING APPARATUS ESPECIALLY AUDIO METER

Hermann Wiese, Bremen-Aumund, Germany, assignor to Atlas-Werke Aktiengesellschaft, Bremen, Germany, a firm Application May 13, 1953, Serial No. 354,729

2 Claims. (Cl. 179—1)

The present invention relates to electroacoustical measuring devices and more particularly to such measuring devices in which a control panel or board is provided upon which acoustical measurements may be semi-automatically registered or recorded to provide plots or curves of sound waves. Known electro-acoustical measuring devices are in general constructed with the operating or control panel situated on the upper side of the front side of a casing unprotected in any way.

The present invention has for one of its purposes the construction of an acoustical measuring apparatus in which the control panel will be as low as possible over the level on which the device may stand with other parts of the device being built upwards to a higher level to furnish a shielding of the control, operating or plotting table by means of which the device is operated.

In the present invention this is accomplished by constructing the apparatus with a low forward section formed as a part of the casing or housing on which the most important operating elements are mounted and a rearward higher or back portion of the housing or casing to receive other elements of the apparatus. There is preferably provided a common base plate on the underside of which only certain electrical elements are attached which take up in height comparatively little room. The upper side of such a common base plate is used as the control panel or plotting board upon which the semi-automatic curves are plotted and in the rear part are mounted such elements or units which are larger or higher and which may be enclosed in an upwardly extending housing.

The construction of the apparatus according to the present invention is particularly suitable for electro-acoustical measuring devices which are provided with semi-automatic writing or plotting means especially audio meters with accessory recording or writing devices for showing or plotting sound wave curves. No special table or platform is necessary for mounting the apparatus since it is constructed as a unitary structure and may be placed on an ordinary table and be conveniently used since the plotting board or panel is only slightly higher than the level on which it rests. It has a further advantage in that the operator will be positioned normally behind the device and can see at a glance the record which is being made.

The common base plate can itself be formed as a part of the housing and have those parts particularly secured to its underside which are advantageously associated with the operating controls on the panel, while the portions in the rear of the assembly which may be also mounted on the common base plate may be covered with an upwardly extending hood or casing.

The use of a common base plate for supporting parts of the apparatus as well as for serving as a plotting board and a control panel has the advantage of structural simplicity as well as distinctiveness of arrangement and acceptability over apparatus of similar construction previously made. Furthermore the exposed parts on the operating and control panel are to a great extent protected by the upwardly extending casing or hood which covers larger elements or units of the apparatus.

A further advantage of the present invention is in the construction and arrangement of the plotting board or panel in which control elements are provided which are adjustable in linear directions at right angles to each other so that sound wave curves may be plotted on a cartesian coordinated basis upon suitably ruled or marked paper lying on the face of the control board or panel.

A further advantage of the present device is provided in the arrangement of the elements including the arrangement of microphone in the forward wall of the raised housing above the control panel facing the operator, as well as the arrangement of the control element on the control panel.

Other and further advantages of the present invention and construction will be more clearly understood from a consideration of the specification set forth below when taken in connection with the drawings illustrating an embodiment of the same, in which.

Figure 4:
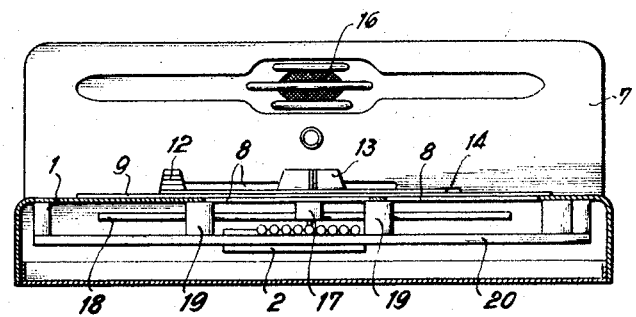

The invention of the audio meter as illustrated in the drawings, serves to measure and to semi-automatically record sound wave curves. It comprises in general a base plate 1 upon the lower and upper surfaces of which certain electrical and mechanical apparatus or parts are mounted or secured. On the upper side of the base plate 1 there are mounted certain control and operating elements in its forward section. On the lower side of the base plate there are included only such mechanical and electrical parts which occupy little height, so that the base plate 1 need not be raised far above the level of the table or other surfaces on which it rests. As an illustration of this, the lower face of the base plate may be provided with such things as a frequency control switch 2, a potentiometer 3 as well as other small elements not shown in the drawing. Larger and higher structural devices such for instance as the decibel divider 4, electronic tubes 5 and condensers 6 as well as large elements as transformers, for instance, not shown, are mounted on the back portion of the base plate which is covered by a housing or hood 7. The base plate 1 has certain cut-out areas such as the sections 8, see Figures 3 and 4, by means of which the control devices mounted on the panel or control board which have extensions through the base plate or housing may operate the electrical elements beneath the base plate or within the housing to make the necessary adjustment of the electrical or mechanical elements carried thereby.

Also these openings 8 provide useful access to the elements mounted in the forward part of the housing. The openings 8 in the forward part of the base plate 1 are covered by a plate panel or board 9 which may serve as a plotting table and upon which may be mounted a paper sheet 11 which may be ruled as desired in coordinate fashion so that sound wave and other curves may be readily examined. The sheet 11 may be held down by thumb tacks or pins 10 or secured in any other manner. When recording sound waves on rectangular coordinate basis, the volume control element and the frequency changing switches may be made as sliding elements which can be operated and controlled by hand knobs such as 12 and 13 which are mounted over the plotting or recording table 9 and which may be adjustably positioned so that one element may be made to correspond to one coordinate value and the other element to the other coordinate value. For instance the control knob or slider 12 may be provided with a glass plate 22 with a plurality of holes or perforations 14 through the same, through which marks may be made upon the paper sheet 11 by use of a pencil or any other suitable instrument. The knob 13 may also be provided with a ruler 15 attached to it positioned beneath the plate 22. This ruler is provided with a slot 23 running lengthwise of the ruler so that the slot and holes will align one over the other as they are adjusted to make the desired measurements.

Figure 1:
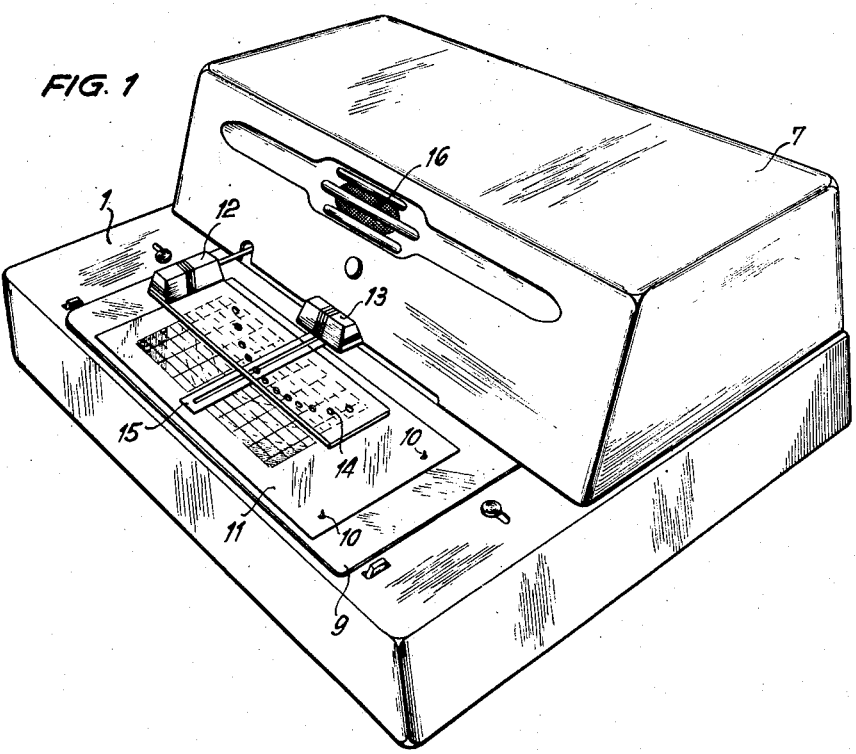
Figure 1 shows a perspective view of the audio meter according to the present invention.

As indicated in Figure 1 the knob 13, which may for instance be the frequency control slide, may be adjusted laterally across the board or plotting panel, while the knob 12 with its plate 22 may be adjusted forward and rearward of the same panel in positions over the ruler 15.

Figure 2:
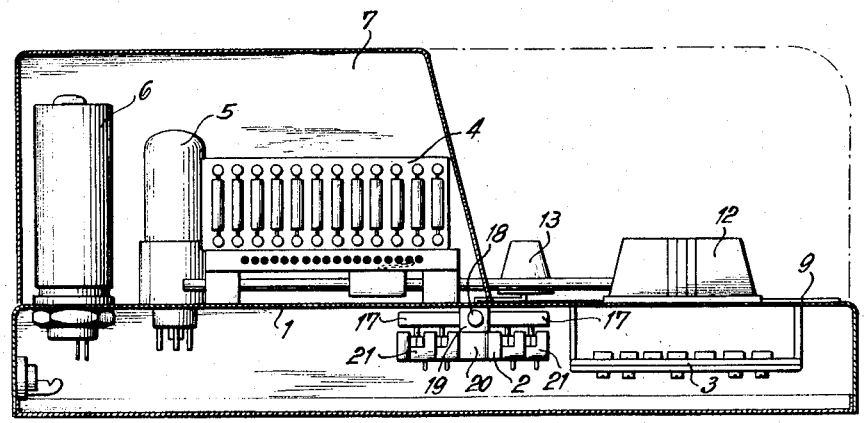
Figure 2 shows a cross section through the device shown in Figure 1.

As will be seen in Figures 1 and 2, the control 13 has an extension beneath the base plate 1 and controls, by its movement, the operation of the frequency adjustment switch or element 2, while the control 12 has a rod 24 which extends into the housing 7 and which may operate the volume control element such as the decibel divider or intensity measuring element 4. The points of intersection of the slot 23 and the perforations 14 are used as pencil guides for plotting the measured values on the audiogram blank paper 11; the horizontal axis indicating the frequency and the vertical axis indicating the volume as viewed looking from the left hand side of the plotting board as seen in Figure 1.

For the purpose of making acoustical examination, a microphone is provided which is preferably positioned behind the opening 16 in the forward upper part of the housing 7.

By using the base plate 1 as a portion of the housing for parts which are attached to it on the underside, the housing will be more rigid since the base plate then serves the purpose both as a mounting panel and a portion of the housing which under other circumstances would be made comparatively thin. In order to obtain better rigidity in the construction of the apparatus with lighter materials, the elements attached to the base plate could also serve as stiffening members. For instance the frequency control element such as the member 2 could be used to add stiffness to the underside of the base plate and so also the volume control potentiometer 3.

The contact slide 17 connected to the frequency control handle 13 is supported by a rod 18 which is guided by a pair of bearings 19 fastened to the underside of the base plate 1.

The bearings 19 are also supported by a bracket 20 upon which the fixed contact brackets 21 are mounted. (See Figure 2.) The bracket 20 is extended beyond its necessary length to the end of the base plate where it is secured.

Figure 3:
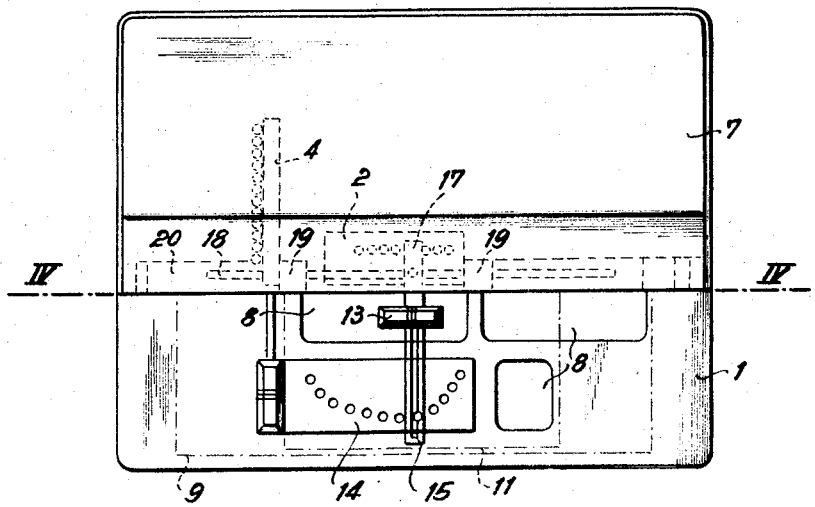
Figure 3 shows a plan view looking downward with the control panel marked off in dash-and-dot lines, and, Figure 4 shows a cross section taken on the line IV—IV of Figure 3.

In the operation and use of the apparatus, each adjusted value or point of measurement on the acoustic curve may be plotted by means of the ruler 15 and the plate 22. The volume control knob 12 as viewed in Figure 3 is moved vertically extending or retracting the rod 24 which goes into the hood or housing 7 and at the same time the frequency control knob may be adjusted horizontally as viewed in Figure 3 until the desired response is obtained. The intersection of the slot 23 and the nearest perforation 14 will give the desired point for plotting the sound intensity curve. This may then be recorded or registered on the paper 11 by pencil or other suitable means.

It is evident therefore that the apparatus may be used quickly and simply for plotting hearing loss curves.

The invention is not confined to the embodiment as shown. Other variations are possible and will readily be understood.

The forward portion of the casing on which the control elements are mounted may also be protected by a cover or casing which could be folded or hinged and the entire device could be similarly covered. Such protective cover or casing could also serve to contain parts for replacements and other uses. Further the casing could be provided with a carrier handle.

The housing or casing could also be constructed in other ways. For instance the whole base plate can be taken up by a housing which encloses the elements which are positioned beneath it as well as those above it, and either the apparatus would be operated from the top and be provided with a removable floor plate, or the base plate would be pushed into the housing from the back which would then have a detachable rear wall.

Having now described my invention, I claim:

1. Electroacoustic measuring apparatus for plotting sound wave curves semi-automatically comprising a housing having a flat low control panel in its forward section and an upwardly extending rear section acting as a shield to prevent observation of the control panel by a patient, means operative over said control panel for making adjustments of said measuring apparatus, comprising a volume control mounted in said rear section with a longitudinal adjusted control rod extending through said rear section over said control panel and having an operating knob adjustable in the longitudinal direction of said rod, over said control panel and frequency control means having an element adjustable at right angles to said rod over said control panel and means controlled by said means for establishing automatically points to be plotted forming elements of said sound intensity-frequency curves.

2. Electroacoustic measuring apparatus for plotting sound intensity-frequency curves semi-automatically comprising a housing having an upwardly extending rear section with a low flat forward section, a plotting table mounted on the low flat forward section, said upwardly extending rear section acting as a shield to prevent observation of the plotting table by a patient, a frequency control device positioned in the rear section of the housing having an operating arm extending through the wall of the housing and adapted to be moved externally across the front of the housing over the plotting table, a volume control device positioned in the rear sections of the housing and having an operating rod projecting through the housing and adapted to move longitudinally in a direction at right angles to the movement of said operating arm into and out of the rear section of said housing whereby a plot of an individual hearing characteristic may be observed.

References Cited in the file of this patent
UNITED STATES PATENTS

| | | |
|---|---|---|
| 2,156,945 | Huth et al. | May 2, 1939 |
| 2,663,377 | Grandjot | Dec. 22, 1953 |